United States Patent
Millard et al.

(10) Patent No.: US 8,049,664 B2
(45) Date of Patent: Nov. 1, 2011

(54) MULTI-BAND, MULTI-CHANNEL, LOCATION-AWARE COMMUNICATIONS BOOSTER

(76) Inventors: Michael P. Millard, Deerfield Beach, FL (US); Jeremy K. Raines, Rockville, MD (US)

( * ) Notice: Subject to any disclaimer, the term of this patent is extended or adjusted under 35 U.S.C. 154(b) by 54 days.

(21) Appl. No.: 12/319,242

(22) Filed: Jan. 6, 2009

(65) Prior Publication Data
US 2010/0171654 A1 Jul. 8, 2010

(51) Int. Cl.
*G01S 19/14* (2010.01)
*H04B 7/15* (2006.01)

(52) U.S. Cl. .................. 342/357.52; 455/11.1

(58) Field of Classification Search ............... 342/357.1, 342/357.13, 357.17, 357.52; 455/522, 571, 455/11.1, 13.4
See application file for complete search history.

(56) References Cited

U.S. PATENT DOCUMENTS

| | | | | |
|---|---|---|---|---|
| 5,023,930 A * | 6/1991 | Leslie | ............... | 455/9 |
| 6,233,448 B1 * | 5/2001 | Alperovich et al. | .......... | 455/417 |
| 6,459,881 B1 * | 10/2002 | Hoder et al. | ................. | 455/11.1 |
| 6,999,725 B2 * | 2/2006 | Nitta et al. | ................... | 455/63.1 |
| 7,123,911 B1 * | 10/2006 | Ngan | ........................ | 455/435.2 |
| 7,206,294 B2 * | 4/2007 | Garahi et al. | ................. | 370/315 |
| 7,245,908 B1 * | 7/2007 | Weaver et al. | ................ | 455/430 |
| 7,457,584 B2 * | 11/2008 | Baker et al. | ................... | 455/11.1 |
| 7,831,263 B2 * | 11/2010 | Sheynblat et al. | ......... | 455/456.5 |
| 2004/0239975 A1 * | 12/2004 | Kawaura et al. | ............ | 358/1.14 |
| 2005/0203937 A1 * | 9/2005 | Nomura | ....................... | 707/102 |
| 2007/0197207 A1 * | 8/2007 | Carstens et al. | ............. | 455/423 |
| 2009/0023458 A1 | 1/2009 | Mountney | | |
| 2009/0061781 A1 * | 3/2009 | Zhang | .......................... | 455/66.1 |
| 2009/0291690 A1 * | 11/2009 | Guvenc et al. | ................ | 455/444 |
| 2009/0318181 A1 * | 12/2009 | Tao et al. | ...................... | 455/522 |
| 2010/0297937 A1 * | 11/2010 | Kim | ............................ | 455/11.1 |

FOREIGN PATENT DOCUMENTS
KR 2007083134 A * 8/2007
SE 200100675 A * 8/2002

\* cited by examiner

*Primary Examiner* — Thomas Tarcza
*Assistant Examiner* — Cassie Galt (57) ABSTRACT

The invention is a device for multiband, multi-channel, wireless communications that automatically provides signal amplification when necessary, and that automatically avoids harmful interference to base stations and other parts of the communications infrastructure. The device is especially suitable for, but not limited to, cellular and PCS bands and channels. The invention is a unique combination of a bidirectional amplifier, a GPS receiver, a processor, and a removable, updatable memory. The memory stores comprehensive information that determines if amplification is necessary at a particular location sensed by the GPS receiver. Because the memory is removable and updatable, it therefore provides protection against piracy and unauthorized and improper use.

16 Claims, 10 Drawing Sheets

FIG. 6D ATTRIBUTE DISPLAY

MULTI-BAND, MULTI-CHANNEL, LOCATION-AWARE COMMUNICATIONS BOOSTER

FIELD OF THE INVENTION

The present invention relates to wireless communications boosters, including but not limited to cellular/PCS boosters, which automatically adjust their gain and reduce their interference by comparing their GPS derived positions with a collection of attributes stored in removable and updatable electronic memories.

BACKGROUND OF THE INVENTION

Wireless communication networks are limited, with respect to range and coverage, by deterioration of signals to unacceptably weak levels. Indiscriminately boosting or amplifying signals by individual subscribers, however, causes interference that can render large portions of the network useless. Such interference causes harm to both the subscriber and the service provider. The subscriber loses the service that he or she originally hoped to enhance by signal boosting. The service provider loses revenue from unrealized connections and eventually from lost subscribers dissatisfied with poor service. What is needed is a communications booster that is sufficiently "smart" and foolproof to know when and where to amplify or not to amplify.

In particular, a smart communications booster must be able to sense where it is located with respect to base stations. For example, if it is too close to a base station, then it can cause overwhelming interference to the base station with an unnecessarily amplified signal. To prevent such interference, the smart booster must have continuous access to a map so that it can compare its location with the known locations of base stations. A memory card, which is an essential part of this invention, is the ideal way to provide a map. Further, such memory cards are removable so that they can be revised or replaced as the locations of base stations, and other attributes of the communications infrastructure, change over time.

Methods presently exist to compensate primarily for the deterioration of signals, with little or no attention to the interference those methods may cause. In the case of cellular and PCS communications networks, for example, four such methods are: 1) bi-directional amplifiers, or BDAs; 2) additional cell sites; 3) femtocells; and 4) private subscriber high gain antennas. Bi-directional amplifiers boost both uplink and downlink signals, without regard to signal strength. Additional base stations can provide service at locations where coverage was not previously available. Femtocells extend coverage into small regions such as home interiors by transferring the wireless link to the internet. Individual subscribers can attach special purpose antennas to their transceivers that provide signal gain. All of these approaches, however, have significant disadvantages.

Bi-directional amplifiers, or BDAs, boost both uplink and downlink signals whether the subscriber is located far away from or in close proximity to a base station. In the latter case, the boosted uplink signal overwhelms the base station, rendering it effectively inoperative. The interfering signal may exceed that allowed by FCC regulations. Countless connections are dropped or never completed so long as the subscriber remains in close proximity. BDAs cannot sense their locations with respect to base stations. BDAs are completely uncontrolled by service providers, leaving those providers unprotected. They cannot be remotely controlled so that an adversely affected base station might switch them off. It follows that BDAs cause substantial loss of revenue to service providers.

Additional cell sites are not practical in many cases, especially at the very locations where they might do the most good. In marginal areas with few subscribers, the capital expenditure for a complete base station cannot be justified. In residential areas, restrictive zoning and public opposition, prevent the construction of new base stations.

Femtocells are by design limited to locations that can provide internet access. So, except within the confines of a small region, such as a home interior, they are not suitable for mobile use. They are certainly not suitable for wide ranging mobile stations.

Customized antennas for individual subscribers are generally not practical. They are by definition expensive compared with mass produced antennas. They require specialized engineering knowledge by the subscriber. Generally, they are large and must be carefully oriented so that they are not suitable for mobile stations. Again because of size or elevation on a tall tower, they may be prohibited by zoning restrictions.

SUMMARY OF THE INVENTION

The invention is a "smart" communications booster for mobile stations, suitable for multi-band and multi-channel operation, including, but not limited to cellular and PCS (Personal Communication System) bands. It provides amplified signals where such signals would otherwise be weak and unusable, yet refrains from amplification when it is unnecessary and would cause harmful interference to base stations and other parts of the communications infrastructure. To achieve this, the invention is a unique and novel combination of a bidirectional amplifier, a GPS receiver, a processor, and a removable, updatable memory. The bidirectional amplifier provides signal enhancement when needed. The GPS receiver senses the location of the mobile station. The processor and memory determine whether or not amplification is necessary based upon the sensed location. Further, the processor and memory determine which communications bands and channels are in use at the location, and provide amplification only for those bands and channels. Thus, this invention overcomes the chief disadvantage of existing communications boosters, that is, the harmful interference caused by unnecessary amplification.

A unique feature of the invention is a removable and updatable memory card. Thus, information about the location determined by the GPS receiver is kept current, ensuring that amplification is provided and interference is avoided, according to the most recent configuration of the communications infrastructure. Further, the memory card includes security provisions so that it cannot be pirated and can be issued only by authorized sources, such as a communications carrier provider.

It is therefore an object of the invention to automatically provide amplification of communications signals between mobile and base stations when such signals are otherwise too weak to be useable.

It is another object of the invention to automatically avoid amplification when it is unnecessary and would cause harmful interference to base stations and other parts of the communications infrastructure.

It is another object of the invention to use GPS (Global Positioning System) to automatically sense the location of the mobile station.

It is another object of the invention to use a processor plus memory to automatically evaluate the location in order to determine the necessity of signal amplification.

It is another object of the invention to provide a removable and updatable memory card so that the latest configuration of the communications infrastructure is used to determine the need for amplification or for the avoidance of harmful interference.

It is another object of the invention to provide security measures so that the memory card cannot be pirated or used in a manner such that harmful interference would result to communications infrastructure.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the figures.

DETAILED DESCRIPTION OF THE PREFERRED EMBODIMENT

Figure 1:
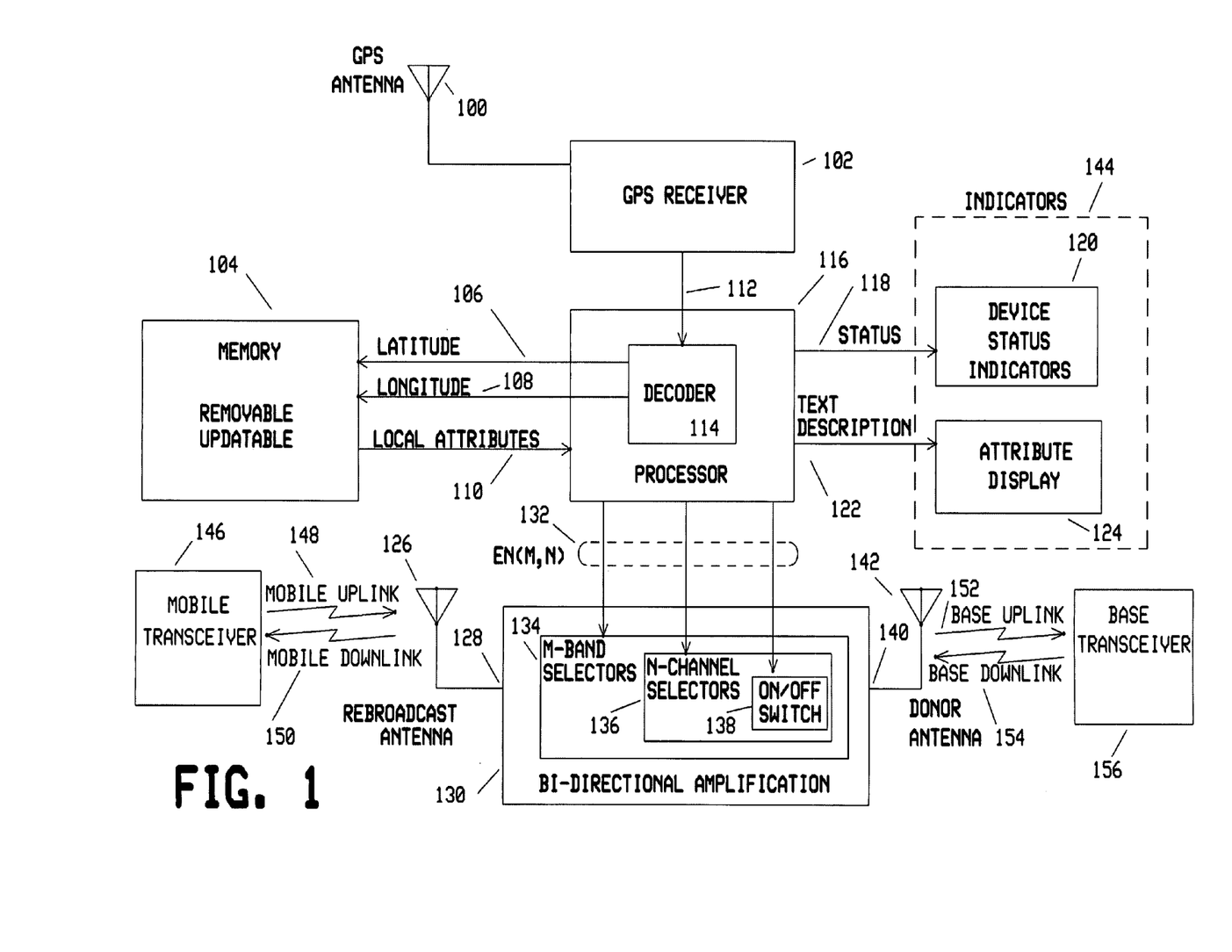
FIG. 1 is a block diagram view of a cellular booster with GPS base map and band-channel specific operation.

FIG. 1 is a block diagram of the invention, showing a cellular booster amplifier coupled to a Global Positioning System receiver to provide geographic coordinates, and also coupled to a Memory 104 containing communications related attributes such as bands, channels, and proximity to base stations at those geographic coordinates.

A novel feature of the invention is its ability to sense its geographic location. This is accomplished using Global Positioning System (GPS) signals incident on the GPS Antenna 100, which, in turn conducts those signals into the GPS Receiver 102. The GPS Receiver 102 delivers data using a Decoder Bus 112 into a general purpose digital Processor 116. Within the Processor 116, a specialized Decoder 114 extracts the geographic location of the device, expressed as a pair of coordinates, i.e., latitude and longitude. These coordinates are compared with stored pairs in the Memory 104, using the Latitude Bus 106 and Longitude Bus 108. Along with each stored pair is a file of useful attributes for that location. An example of an attribute might be proximity to a communications tower or base station, the communications bands and channels in use at that location, or the presence of a distinctive structure such as a tunnel. These attributes are communicated from the Memory 104 to the Processor 116 via the Attribute Bus 110. So, the combined use of the GPS Receiver 102, Processor 116, and Memory 104 provides the invention with its unique ability to sense where it is located and what is unique and special about that location.

The invention also provides features relating to human factors which inform the user of its status and activities. These features are collectively displayed in the Indicators 144 component of the invention. The statuses of various device components are communicated via the Status Bus 118, and are displayed as lights such as LEDs. These lights are concentrated or clustered in the Status Indicator 120. Attributes of special interest are described as text, and these are communicated from the Processor 116 via the Text Bus 122 to the Attribute Display 124. The Attribute Display 124 can be an LCD or other type of legible display.

The main purpose for sensing the geographic location and related attributes is to selectively control the amplification of duplex communication signals using a Bidirectional Amplifier 130. To this end, the Processor 116 delivers control signals to the Bidirectional Amplifier 130 via the Enabler Bus 132. The control signals are logically arrayed or sorted according to band and channel. In the drawing, the array is written as EN(M,N). EN is shorthand for "enabling array". M denotes Band M, and N denotes Channel N. Thus, EN(M,N) is the enabling signal for Channel N within Band M. The enabling signal itself has only one of two values, "on" or "off". If it is "on", then the Bidirectional Amplifier 130 is operational for Channel N within Band M. If the enabling signal is "off", then amplification is not required and the amplifier is deactivated.

In operation, three enabling signals are communicated. One identifies the band or bands in use at the geographic location of the device. It activates the appropriate devices within the Multi-band Selector 134. A second signal identifies the channel or channels in use at the geographic location. It activates the appropriate devices within the Multi-channel Selector 136. The third signal actually activates or deactivates the amplifier or amplifiers specific to those band(s) and channel(s) using the On/Off Switch 138.

Thanks to its unique ability to sense geographic location and pertinent attributes, the invention instructs the Bidirectional Amplifier 130 to increase or enhance the duplex communication signals only when necessary. Base Downlink 154 signals are incident upon the Donor Antenna 142, which in turn is connected to the Bidirectional Amplifier 130 with the Donor Antenna Terminal 140. Similarly, Base Uplink 152 signals are broadcast from the Donor Antenna 142, amplified if necessary. Mobile Downlink 150 signals are transmitted from the Rebroadcast Antenna 126, which is connected to the Bidirectional Amplifier 130 with the Rebroadcast Antenna Terminal 128. Mobile Uplink 148 signals are incident upon the same Rebroadcast Antenna 126. Thus, duplex communication between the Mobile Transceiver 146 and the Base Transceiver 156 is amplified only when necessary, preventing interference due to unnecessary or over amplification.

Figure 2A:
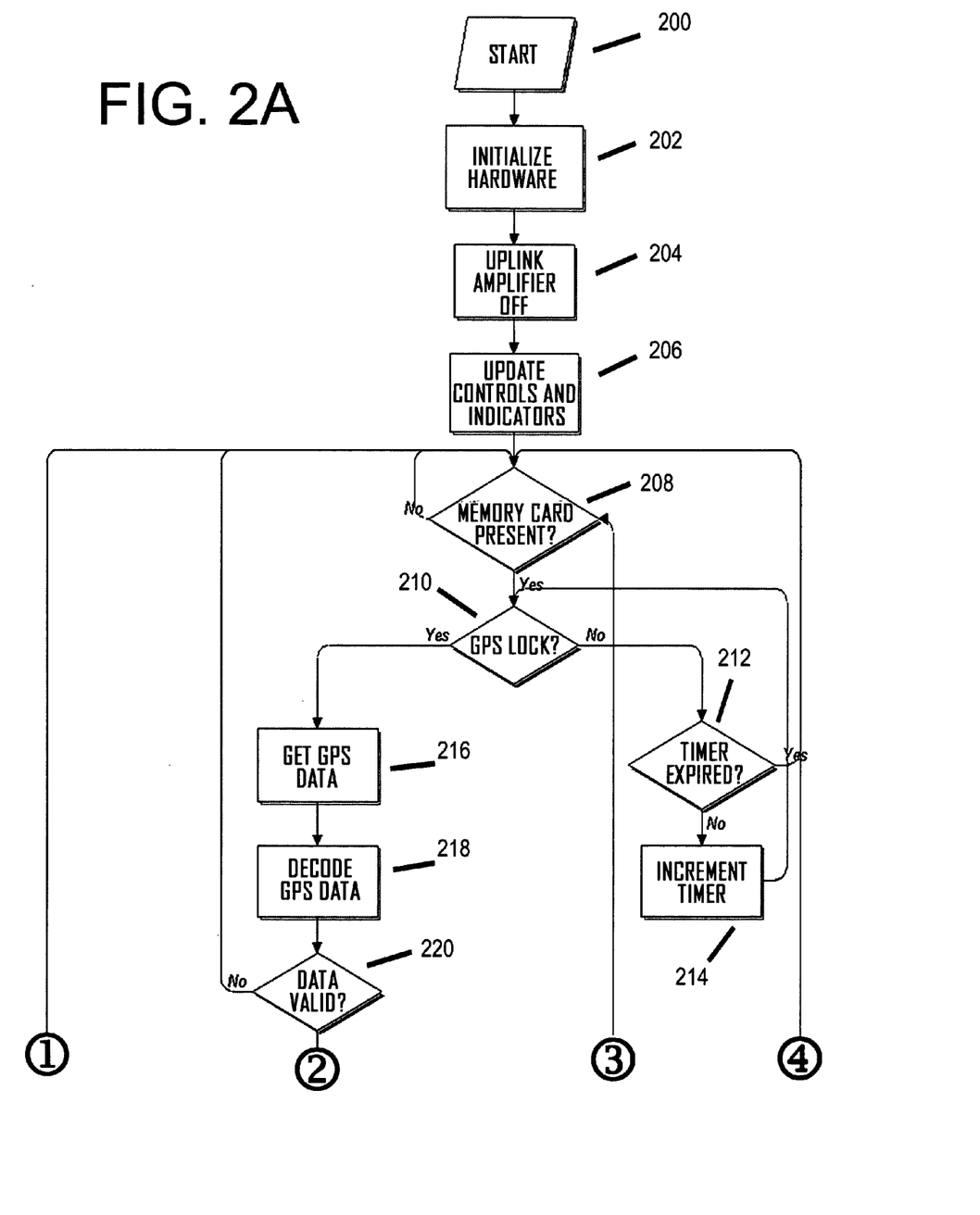
FIGS. 2A and 2B taken together are a flowchart view of a the software program required to operate the present invention.
Figure 2B:
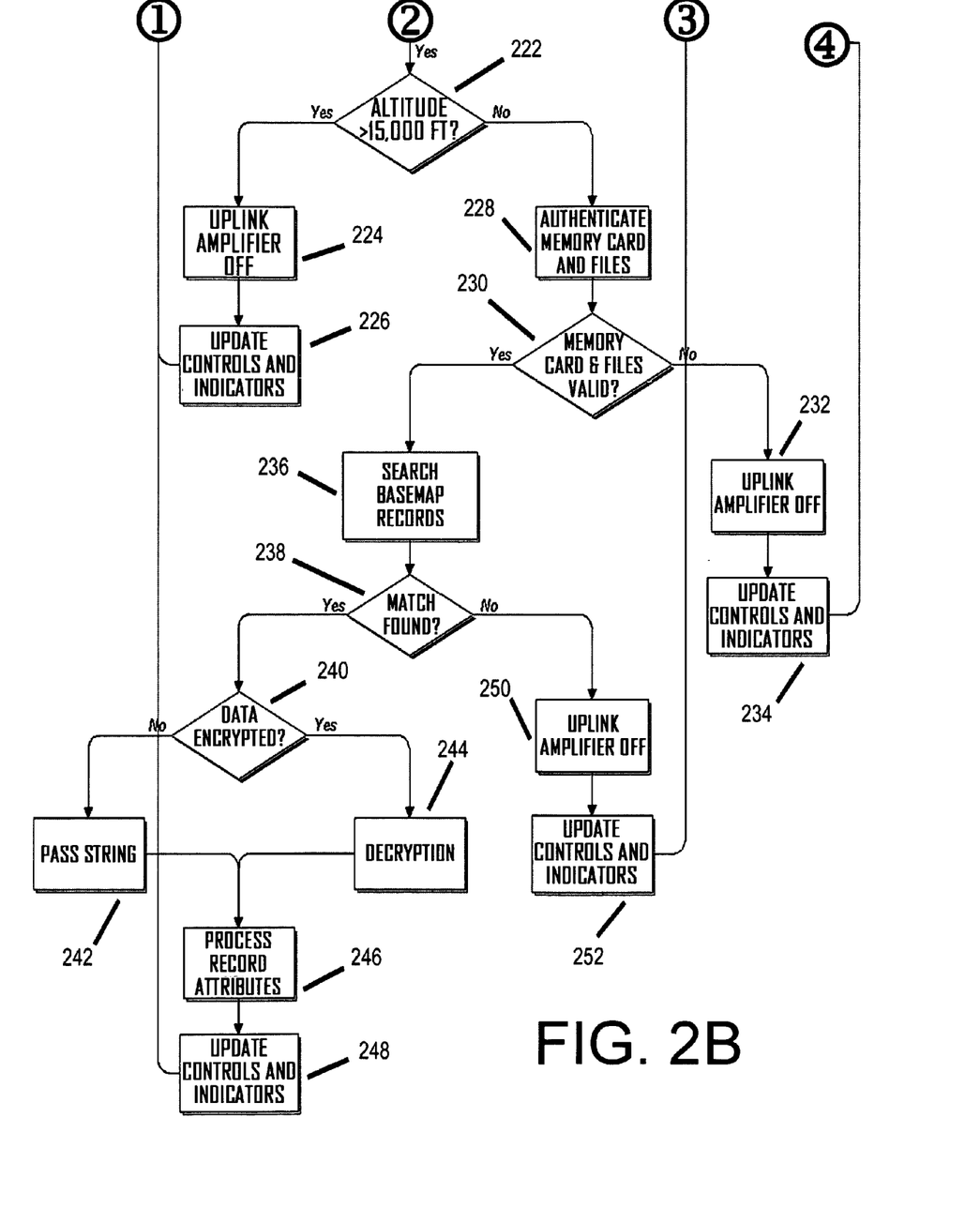

FIGS. 2A and 2B, taken together, are a flowchart view of the software program required to operate the present invention.

The flowchart begins with a Start Block 200. Start Block 200 includes applying power to the device by the user. Start Block 200 then proceeds to Initialize Hardware 202. Initialize Hardware 202 includes resetting the Processor 116 internal memory 104 registers to predetermined values, setting certain software timing values to generate serial data baud rates appropriate for serial data communication with the GPS receiver 102, setting certain software timing values to generate timing signals appropriate for serial data communication with the Memory 104, and instructing the attribute display to accept command on a 4-bit data bus.

Initialize Hardware 202 then proceeds to Uplink Amplifier Off 204, which then disables the uplink amplifier.

Uplink Amplifier Off 204 then proceeds to Update Controls 206, which outputs the corresponding Status Indicator 120 and Attribute Display 124 information.

Update Controls 206 then proceeds to Memory Card Present Decision Block 208, which determines the physical presence of the Memory 104. If the Memory 104 is not present, the device will continuously search in the Memory Card Present Decision Block 208 loop for the Memory 104 to be inserted. This search will terminate if either a Memory 104 is inserted or the device is turned off. If the Memory 104 is present, Memory Card Present Decision Block 208 proceeds to GPS Lock Decision Block 210.

If a GPS signal is not being received an interval timer is set and GPS Lock Decision Block 210 then proceeds to Timer Expired Decision Block 212. Appropriate values for the interval timer associated with the Timer Expired Decision Block 212 range from approximately 30 seconds to 2 minutes and is a pre-determined value. The purpose of the timer is to allow continued operation in the then existing mode of operation during temporary loss of GPS signals. Such situations occur frequently in parking garages, tunnels, canyons, large urban corridors and similar topographies.

If a GPS signal is not being received, the Increment Timer 214 will advance by one second. If the interval timer associated with Timer Expired Decision Block 212 expires, the device will abandon the process 246 of waiting for a GPS signal and proceed to GPS Amp Off 254 block, which will disable the uplink amplifier. GPS Amp Off 254 block then proceeds to the Memory Card Present Decision Block 208.

If a GPS signal is being received, GPS Lock Decision Block 210 then proceeds to the Get GPS Data 216 block, which transfers the GPS Latitude, Longitude, Altitude, Date and Time information to the Processor 116. Get GPS Data 216 then proceeds to Decode GPS Data 218 block which translates the serial data received on the Decoder Bus 112 to values appropriate for further processing by the Processor 116. Decode GPS Data 218 block then proceeds to GPS Data Valid Decision Block 220 which analyzes the syntax of the information received on the Decoder Bus 112 and determines whether such data is corrupt or malformed. If the GPS data cannot be interpreted, GPS Data Valid Decision Block 220 then proceeds to the Memory Card Present Decision Block 208. Note that in this case, the then current operational status of the device is not altered.

If the GPS data is received without errors, GPS Data Valid Decision Block 220 then proceeds to Altitude Decision Block 222 where the GPS altitude information is compared to a predetermined value, typically 15,000 feet. If the current GPS-reported altitude is greater than this predetermined value, Altitude Decision Block 222 then proceeds to Altitude Amp Off Block 224 which disables the uplink amplifier, and then onto Update Controls Altitude Off Block 226 which updates the Status Indicator 120 and Attribute Display 124, and finally, returns program control to Memory Card Present Decision Block 208.

Referring now to Altitude Decision Block 222, if the GPS-reported altitude is less than the predetermined value, typically 15,000 feet, Altitude Decision Block 222 then proceeds to the Authenticate Block 228, which verifies that the Memory 104 presently connected to the device is properly authorized for use.

Authenticate Block 228 then proceeds to Memory Valid Decision Block 230 which performs certain software security algorithms to determine whether the data files stored in Memory 104 have been pirated. If the Memory Valid Decision Block 230 detects tampering with the Memory 104 data files, Memory Valid Decision Block 230 then proceeds to Memory Amp Off Block 232 which will disable the uplink amplifier. Memory Amp Off Block 232 then proceeds to Update Controls Memory 234 to output the corresponding Status Indicator 120 and Attribute Display 124 information.

Referring now to Memory Valid Decision Block 230, if the data files contained in the Memory 104 pass the software security algorithm and are determined to be authentic, Memory Valid Decision Block 230 then proceeds to Find Base Map Record 236.

Find Base map Record 236 searches the Memory 104 for a record matching the then current latitude and longitude data as retrieved from the GPS Receiver 102. Find Base map Record 236 then proceeds to Match Found Decision Block 238. If a record matching the then current latitude and longitude data can not be located within the Memory 104, Match Found Decision Block 238 then proceeds to Match Amp Off Block 250 which disables the uplink amplifier. Match Amp Off Block 250 then proceeds to Update Controls Match 252 which outputs the corresponding Status Indicator 120 and Attribute Display 124 information.

Referring now to Match Found Decision Block 238, if a record matching the then current latitude and longitude data is located within the Memory 104, Match Found Decision Block 238 then proceeds to Data Encrypted Decision Block 240. The Data Encryption Data Block determines whether the matching record retrieved from Memory 104 is encrypted or encoded as a further security measure. If Data Encryption Data Block determines that the matching record is encrypted or encoded, Data Encryption Data Block then proceeds to Decryption 244, where the data is unencrypted or un-encoded, as needed. Decryption 244 then proceeds to Process 246.

If the Data Encryption Data Block determines that the matching record is not encrypted or encoded, Data Encryption Data Block then proceeds to Pass String 242, which accepts the Memory 104 record "as-is". Pass String 242 then proceeds to Process 246.

Process 246 enables or disables all possible combinations of M-bands and N-channels as determined by attribute data stored in the Memory 104 for the then current unique latitude and longitude position. In the event no M-bands are enabled in the attribute data associated with the then current unique latitude and longitude position, the uplink amplifier is disabled accordingly. Process 246 Block then proceeds to Update Controls OK 248 which outputs the corresponding Status Indicator 120 and Attribute Display 124 information.

Figure 3:
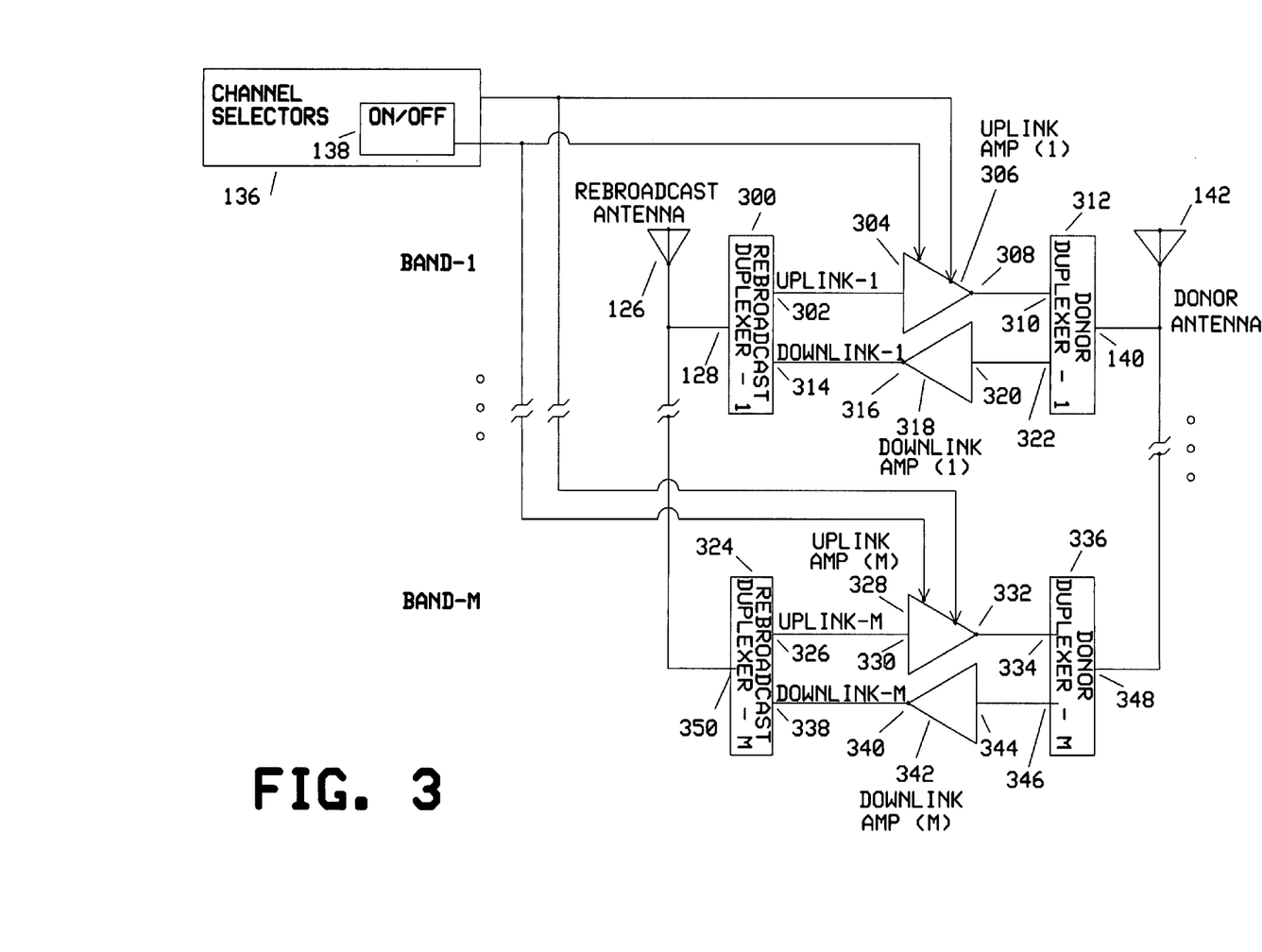
FIG. 3 is a block diagram view of a preferred embodiment of the present invention.

FIG. 3 is a more detailed view of part of the invention, showing a block diagram for a preferred embodiment, focusing on how of the Bidirectional Amplifier 130 is selectively activated or deactivated in response to the attributes retrieved from the Memory 104. The enabling signal E(M,N) for Channel N within Band M is communicated to the Multi-band Selector 134, Multi-channel Selector 136, and On/Off Switch 138 within the Bidirectional Amplifier 130. From there, the signal is routed to a specialized amplifier for the selected band. For example, if an amplifier for Band 1 is to be activated or deactivated, then the signal is directed to the Band 1 Uplink Amplifier 304. More generally, if an amplifier for Band M is to be activated or deactivated, then the signal is directed to the Band M Uplink Amplifier 328. No instructions are required by the Band 1 Downlink Amplifier 318 or by the Band M Downlink Amplifier 342. They are on continuously because we are only concerned with preventing interference by uplink signals that are unnecessarily amplified.

It is seen that the main configurations in the block diagram are repeated for each of M bands. For example, in Band 1, the Band 1 Uplink Amplifier 304 is connected to two duplexers.

It is connected to the Band 1 Donor Duplexer 312 by connecting to the Band 1 Uplink Amplifier Output Terminal 308 to the Band 1 Donor Duplexer Input Terminal 310. It is connected to the Band 1 Rebroadcast Duplexer 300 by connecting the Band 1 Uplink Amplifier Input Terminal 306 to the Band 1 Rebroadcast Duplexer Output Terminal 302. Similarly, the Band 1 Downlink Amplifier 318 is connected to the duplexers via the Band 1 Downlink Amplifier 318 Input Terminal 320 and the Band 1 Downlink Amplifier 318 Output Terminal 316, which are connected to the Band 1 Donor Duplexer Output Terminal 322 and Band 1 Rebroadcast Duplexer Input Terminal 314, respectively.

Repeating the configuration seen for Band 1, more generally, the Band M Uplink Amplifier 328 is connected to the Band M Donor Duplexer 336 by connecting the Band M Uplink Amplifier Output Terminal 332 to the Band M Donor Duplexer 336 Input Terminal 334. It is connected to the Band M Rebroadcast Duplexer 324 by connecting the Band M Uplink Amplifier Input Terminal 330 to the Band M Rebroadcast Duplexer Output Terminal 326. Similarly, for the Band M Downlink Amplifier 342, the Band M Downlink Amplifier 342 Input Terminal 344 is connected to the Band M Donor Duplexer 336 Output Terminal 346; and the Band M Downlink Amplifier 342 Output Terminal is connected to the Band M Rebroadcast Duplexer Input Terminal 338.

All of the duplexers are connected directly to antennas. In general, the Band M Donor Duplexer 336 is connected to the Donor Antenna 142 via a port called the Band M Donor Duplexer 336 Antenna Connection 348. Similarly, the Band M Rebroadcast Duplexer 324 is connected the Rebroadcast Antenna 126 via a port called the Band M Rebroadcast Duplexer Antenna Connection 350.

With the above described combinations of amplifiers, duplexers, and antennas, the invention is capable of providing selective amplification in multiple bands, and for multiple channels within each band.

Figure 4:
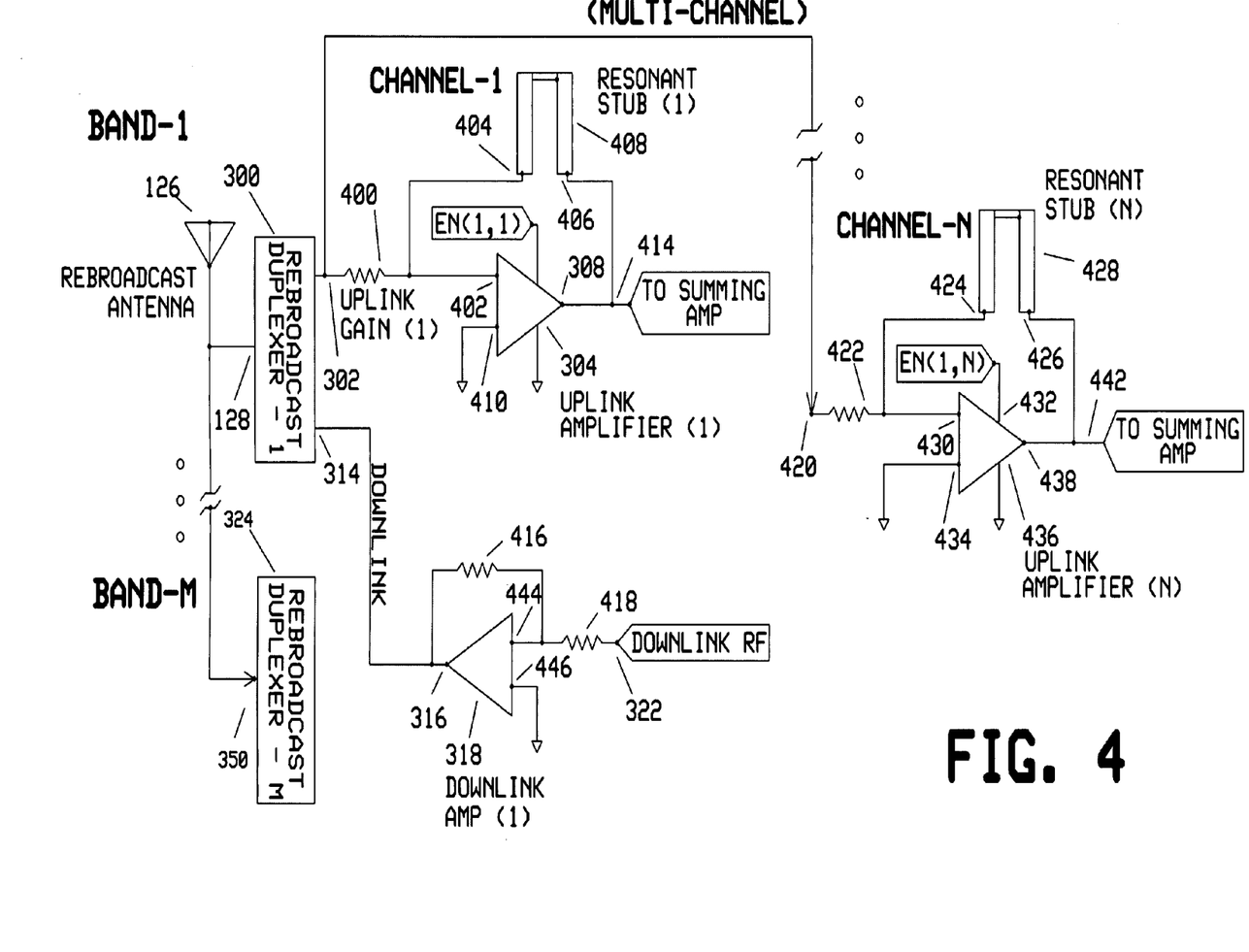
FIG. 4 is a schematic view of a filter section of the preferred embodiment.

FIG. 4 is a more detailed circuit schematic of the band selection block diagram, showing a preferred embodiment of how amplifiers for specific channels within each band are selectively activated or deactivated. The amplifiers are active filters with gain. The filters are tuned to the channel and band that are selected in response to the attributes retrieved from the Memory 104.

It is seen that, in operation, signals from the Mobile Transceiver 146 that are in Channel 1 of Band 1 are incident upon the Rebroadcast Antenna 126. From there, the signals are routed by the Channel 1 Rebroadcast Duplexer into the Channel 1 Uplink Amplifier Input Resistor 400, and from there into the Channel 1 Uplink Amplifier Input Terminal 1 402. The Channel 1 Uplink Amplifier Input Terminal 2 410 is at ground potential. The feedback loop of the uplink amplifier includes principally the Channel 1 Resonant Stub 408 which is a very high reactive impedance at the channel and band of interest, thus providing gain, but only if the enabling signal EN(1, 1) is "on". The resonant stub connected as a series circuit element along the feedback loop via Channel 1 Resonant Stub Terminal 1 404 and Channel 1 Resonant Stub Terminal 2 406. The amplified signals are directed to the Band 1 Summing Amplifier 508 Input Terminal 442 via the Channel 1 Uplink Output Terminal 414.

Downlink signals from the Base Transceiver 156 are routed into the Channel 1 Downlink Amplifier Input Resistor 418, and from there into the Channel 1 Downlink Amplifier Input Terminal 1. The Channel 1 Downlink Amplifier Input Terminal 2 is at ground potential. Gain is determined by the Channel 1 Downlink Amplifier Feedback Resistor 416 in the feedback loop.

More generally, signals from the Mobile Transceiver 146 that are in Channel N of Band 1 are routed to the Channel N Uplink Amplifier Input Resistor 422, and from there to the Channel N Uplink Amplifier Input Terminal 1 430. The Channel N Uplink Amplifier Input Terminal 2 434 is at ground potential. The Channel N Uplink Amplifier 436 is an active filter. The filter is tuned to the Band 1 Channel N frequency by the Channel N Uplink Amplifier 436 Resonant Stub. This resonant stub is connected as a series circuit element within the feedback loop via Channel N Resonant Stub 428 Terminal 1 424 and Channel N Resonant Stub 428 Terminal 2 426. The amplifier itself is activated or deactivated by the enabling signal EN(1,N) via the Channel N Uplink Amplifier Enabling Bus 432. The output of the amplifier is routed to the Band 1 Summing Amplifier 508 Input Terminal 442 via the Channel N Uplink Amplifier Output Terminal 438.

Figure 5:
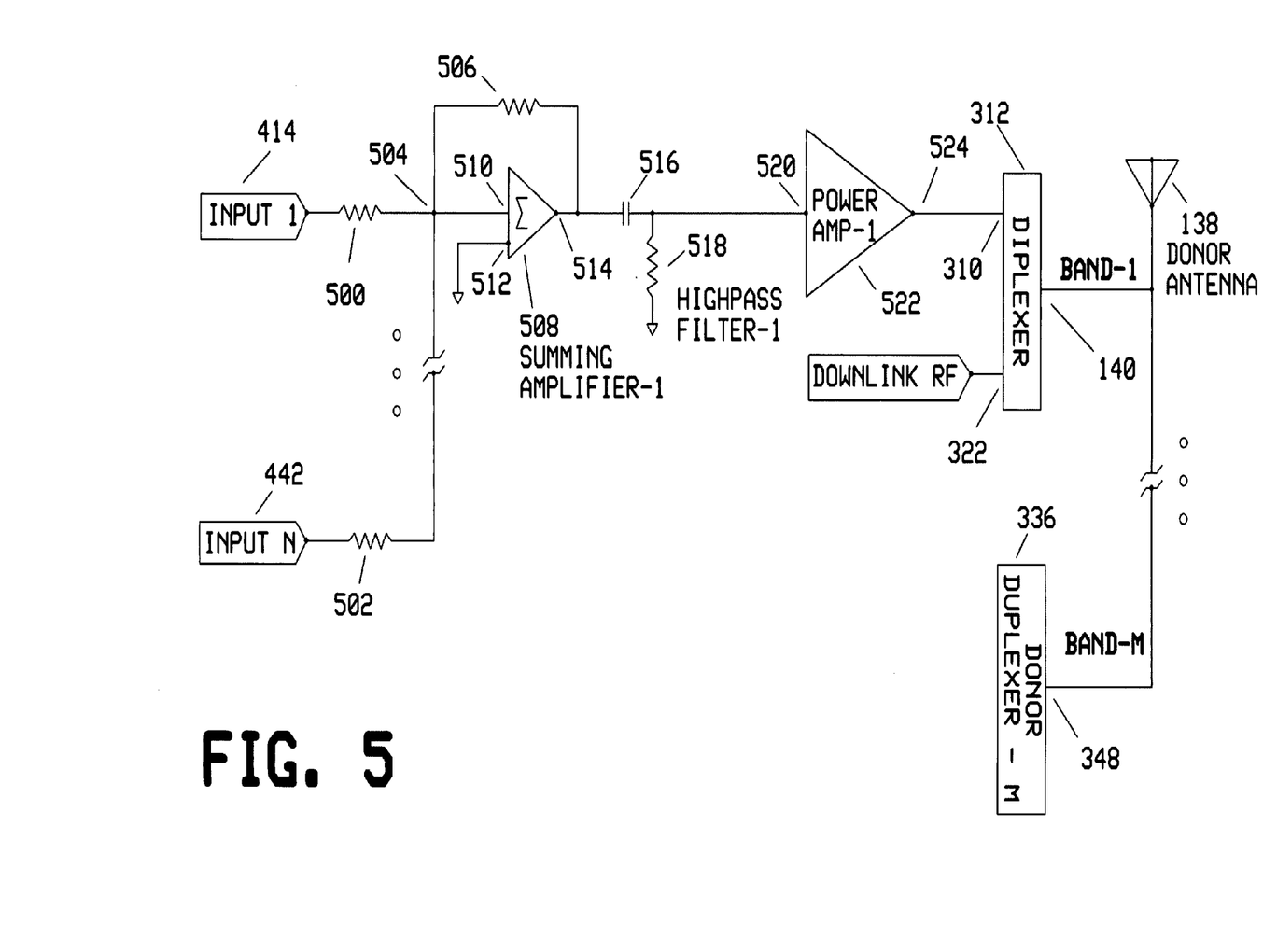
FIG. 5 is a schematic view of a summing and power amplifier circuit of the preferred embodiment.
Figure 6A:
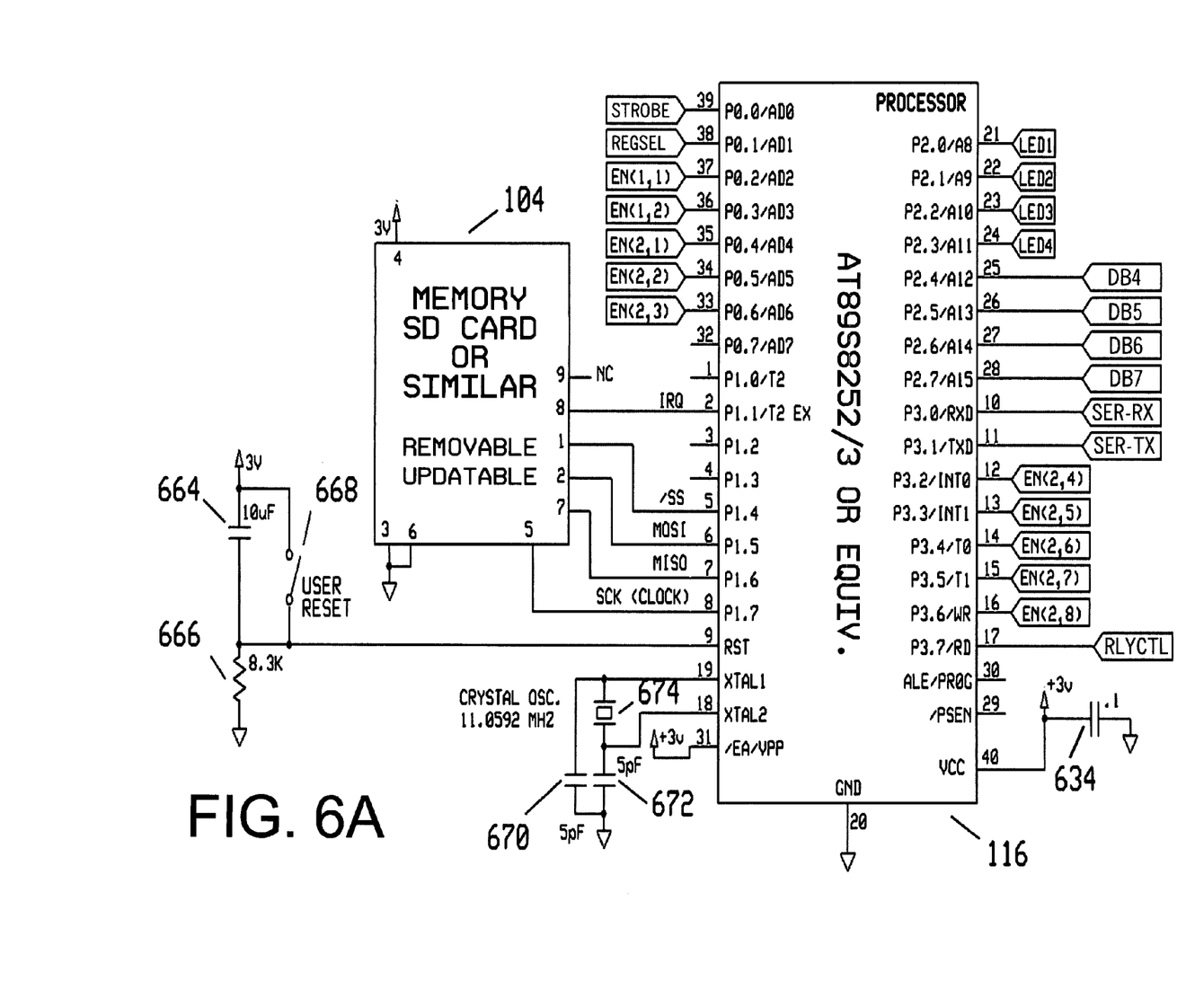
FIGS. 6A, 6B, 6C, 6D, 6E, and 6F taken together are a schematic view of a microcontroller circuit used in the preferred embodiment.
Figure 6B:
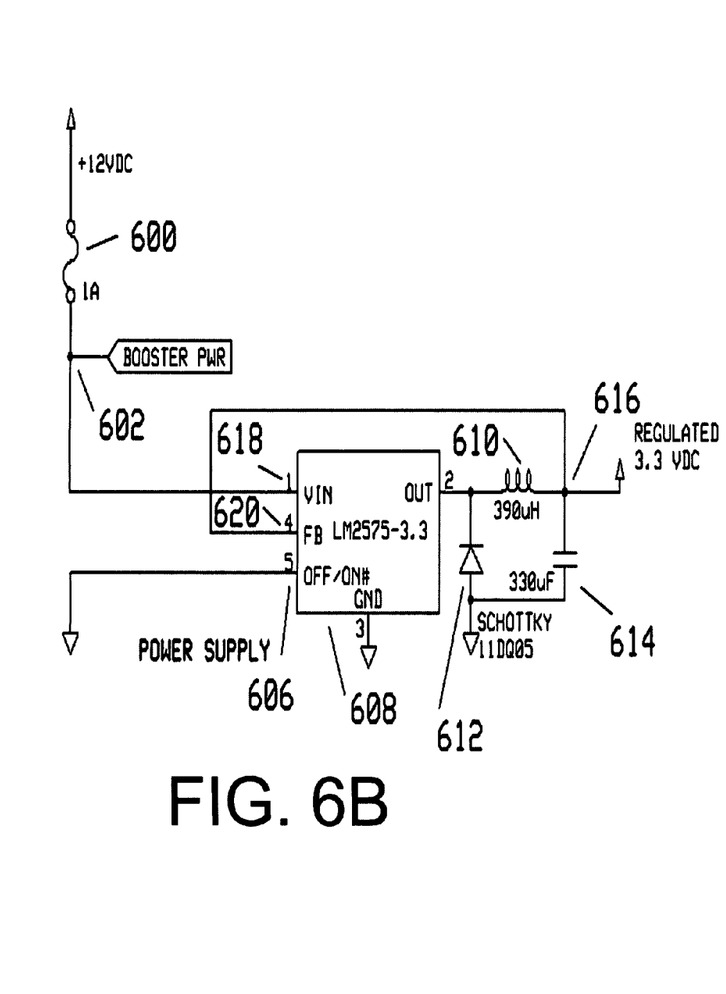
Figure 6C:
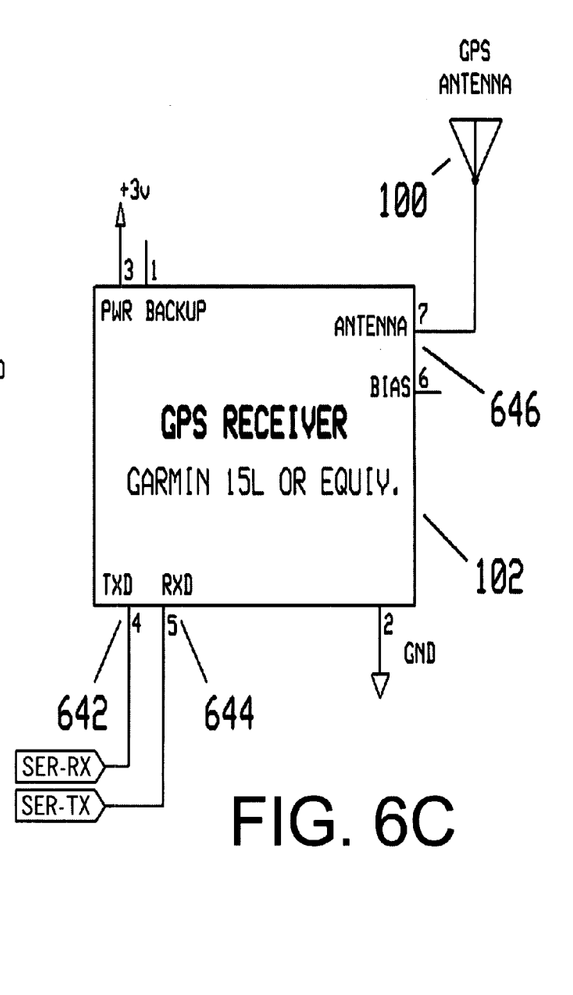
Figure 6D:
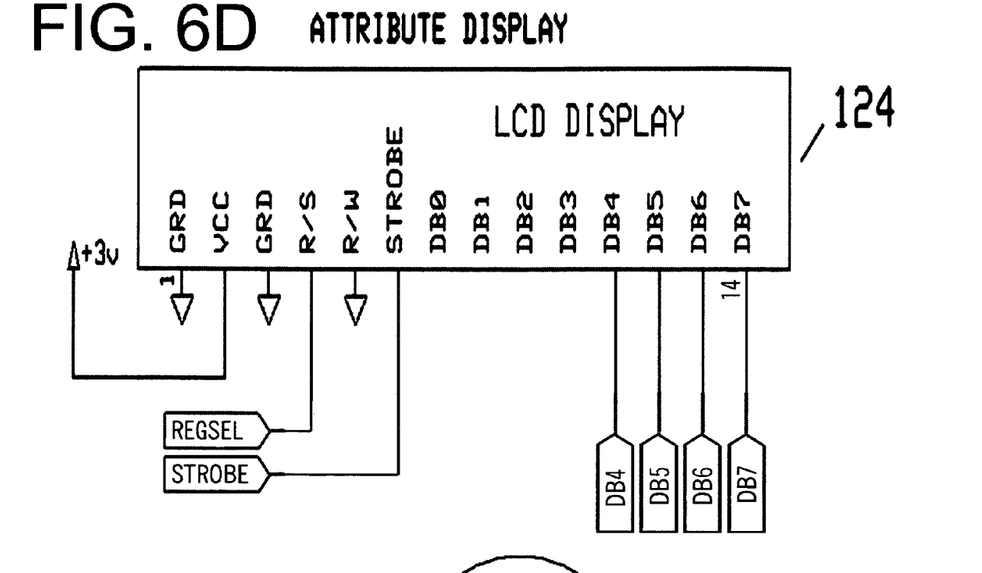
Figure 6E:
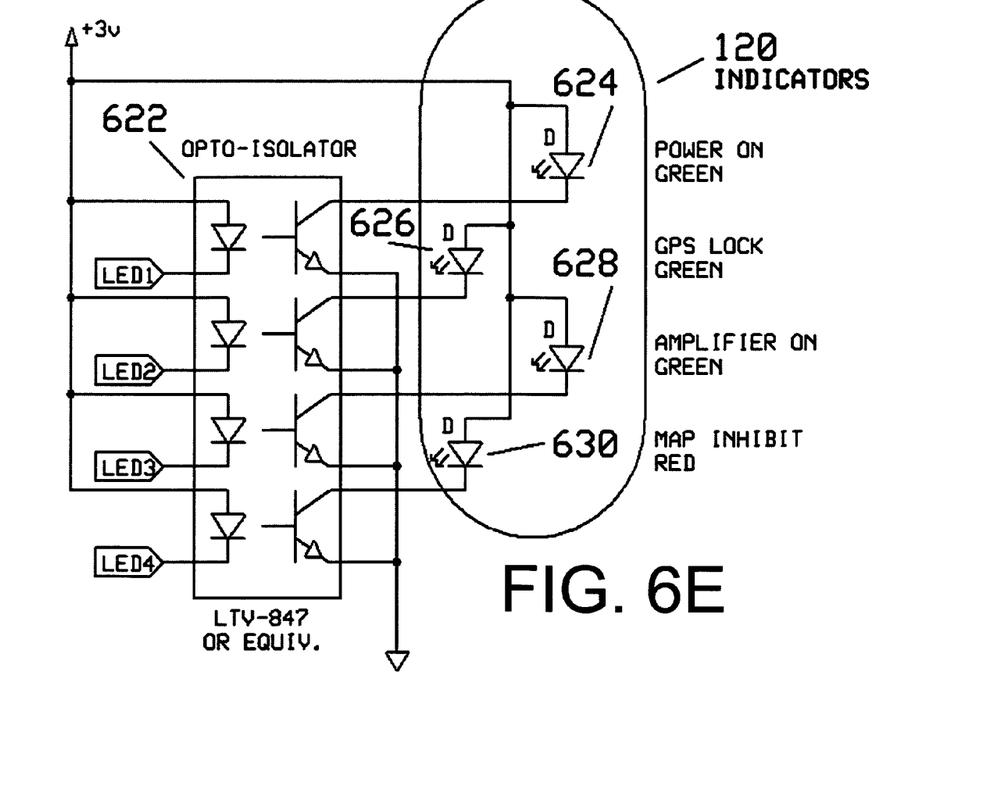
Figure 6F:
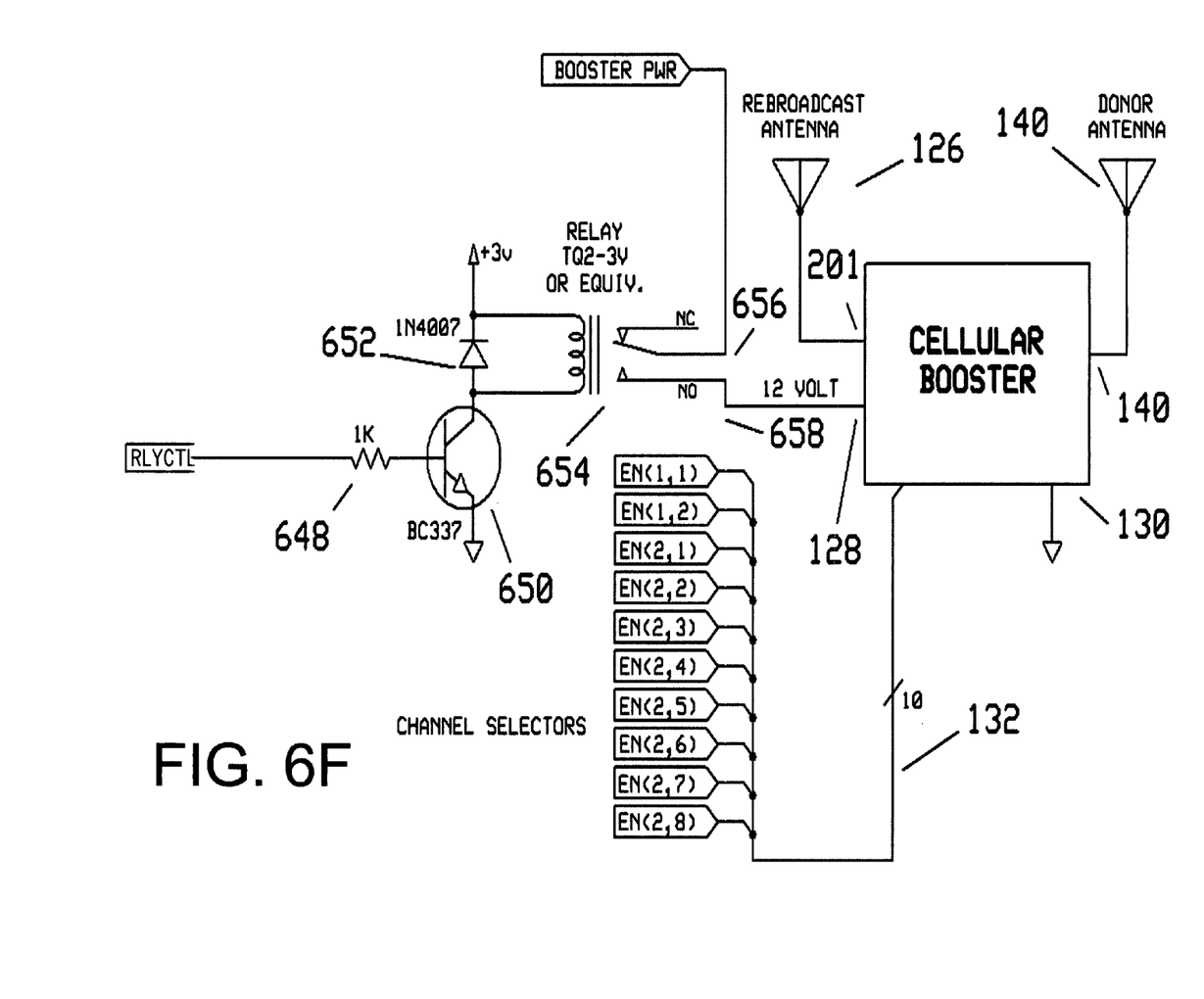

FIG. 5 is a circuit diagram showing the summing and power amplifiers of the preferred embodiment. For each band, it is seen that the outputs from all channel amplifiers are directed into input resistors. For example, the output from the Band 1 Channel 1 Uplink Amplifier 304 is directed into the Channel 1 Input Resistor to Band 1 Summing Amplifier 500. More generally, the output from the Band 1 Channel N Uplink Amplifier is directed into the Channel N Input Resistor to Band 1 Summing Amplifier 502. The signals are then combined at the Band 1 Summing Amplifier Summing Node 504, and from there routed into the Band 1 Summing Amplifier Input Terminal 1 510. The Band 1 Summing Amplifier Input Terminal 2 512 is at ground potential. The gain of the Band 1 Summing Amplifier 508 is determined by the Band 1 Summing Amplifier Feedback Resistor 506.

The amplified, summed signals from all channels in Band 1 appear at the Band 1 Summing Amplifier Output Terminal 514. They are routed through a high pass filter, consisting essentially of a Band 1 High-pass Filter Capacitor 516 and a Band 1 High-pass Filter Resistor 518, to the Band 1 Power Amplifier Input Terminal 520. The Band 1 Power Amplifier 522 provides the final stage of signal gain, and the final, amplified signal appears at the Band 1 Power Amplifier Output Terminal 524. This signal is routed through the Band 1 Donor Duplexer 312, and from there to the Donor Antenna 142 for transmission to the Base Transceiver 156. Thus, selective amplification of weak communications signals has been accomplished.

FIGS. 6A, 6B, 6C, 6D, 6E, and 6F, taken together, are a schematic view of a microcontroller circuit used in the preferred embodiment.

A Voltage Regulator 608 is provided to step down an unregulated voltage present at the Unregulated Voltage Output Terminal 602 to a Regulated Voltage Output 616 of at least 750 milliamps at a direct current voltage of 3.3 volts. A Fuse 600 is provided in series with the Voltage Regulator Voltage Input Terminal 618 to protect against over-current conditions. The Voltage Regulator 608 is a switch-mode design and requires a Voltage Regulator Control Resistor 604, a Voltage Regulator Flyback Coil 610, a Voltage Regulator Diode 612, and a Voltage Regulator Capacitor 614 for proper operation. This voltage regulator 608 is available from many manufacturers including National Semiconductor, Micrel Inc., and ON Semiconductors, having part numbers LM2575T-3.3/NOPB, LM2575-3.3BT, and LM2575T-3.3G respectively. An electrical ground is continuously applied to the Voltage Regulator Control Input Terminal 606 that shall cause the Voltage Regulator 608 to operate at all times. The Voltage Regulator Feedback Input Terminal 620 constantly senses the Regulated Output Voltage and provides an error adjustment internal to the Voltage Regulator 608 to compensate for any changes in the Regulated Voltage Output 616. The Unregulated Voltage Output Terminal 602 also supplies power to the Bidirectional Amplifier 130.

Light-emitting diodes are used to alert the user to the device's operational status. The Power On LED 624 is illuminated whenever the device is powered and extinguished otherwise. The GPS Lock LED 626 is illuminated when a signal is available from the Global Positioning Satellite network and extinguished otherwise. The Amplifier ON LED 628 is illuminated when the Bidirectional Amplifier 130 is actively amplifying any band or channel, and extinguished otherwise. The Map Inhibit LED 630 is illuminated when the Bidirectional Amplifier 130 is disabled in accordance with the attributes associated with latitude/longitude pairs retrieved from Memory 104. All LED indicators 144 are interfaced to the Processor 116 using an Opto-Isolator 622.

The Processor 116 communicates with the GPS Receiver 102 using a serial data link conforming to the Electronics Industry Association Recommended Standard 232 for serial binary data communications. This serial data link uses a Serial Transmitted Data 642 connection for processor 116 to GPS Receiver 102 communication and a Serial Received Data 644 connection for GPS Receiver 102 to Processor 116 communication. A GPS Antenna 100 is connected to the GPS Antenna Terminal 646 on the GPS Receiver 102.

An output Relay 654 is used to optionally provide power to the Bidirectional Amplifier 130. This Relay 654 is controlled by the Processor 116 and requires the use of a Relay Driver Input Resistor 648 and Relay Driver Transistor 650 configured in a common-emitter mode to increase the current available to the Relay 654 coil. The secondary of the Relay 654 provides a Relay Common Contact 656 and a Relay Normally Open Contact 658, together forming a Form-A switch. This Form-A switch is then used to connect the Unregulated Voltage Output Terminal 602 to the Bidirectional Amplifier 130 power connector. A Relay Driver Diode 652 is used to protect the rest of the circuit from excessive voltage spikes generated when the Relay 654 disengages.

The Processor 116 is an 8-bit microcontroller such as the Atmel AT89S8253-24PC or similar device. A Bypass Capacitor 634 is used to filter the 3.3 volt DC supply to the Processor 116. The Processor 116 is reset automatically on device power-up and can be manually reset using the Form-A User Reset Switch 668 connected to an RC timing circuit consisting of a Reset Capacitor 664 and a Reset Resistor 666. The time constant of this RC timing circuit shall be approximately 250 milliseconds. A logic level high on the Processor 116 reset pin will reset the Processor 116. The Processor 116 is clocked by an internal oscillator derived from the Oscillator Crystal 674. Oscillator Capacitor 1 670 and Oscillator Capacitor 2 672 provide enough capacitance to the Processor 116 internal oscillator to guarantee rapid start-up.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A multi-band, multi-channel, location-aware communications booster for reducing interference to communications networks, enhancing the range and coverage of those networks, without changing the operational state of those networks, enabling and enhancing compliance with government regulations comprising:
   a) means for receiving signals from the Global Positioning System (GPS);
   b) means for extracting a measured latitude, a measured longitude, and a current time of the communications booster from the GPS signals;
   c) means for storing in a memory attributes controlling operation of the booster organized according to predetermined stored latitudes and stored longitudes, said attributes comprising proximity to communications towers or base stations, communications bands and channels in use at said latitude and longitude, the presence of structures, and the presence of other communications infrastructure that would be harmed by interference;
   d) means for retrieving said attributes from the memory that correspond to the closest match between the stored latitude and the stored longitude and the measured latitude and the measured longitude, and communicating said attributes to a microprocessor;
   e) means for amplifying uplink signals;
   f) means for amplifying downlink signals;
   g) means for amplifying the uplink signals only on selected bands and channels;
   h) means for the microprocessor to use solely said retrieved attributes to select the band, the channel, and an activate/deactivate setting of said means for amplifying uplink signals;
   i) means for the microprocessor to disable said means for amplifying uplink signals if the measured latitude and the measured longitude are not sufficiently close to any latitude and longitude stored in the memory;
   j) means for a wireless connection, using a rebroadcast antenna, of the booster to user equipment operating in the cellular, PCS, or other radio service, such equipment to include communication handsets, wireless computers, wireless personal digital assistants, wireless video phones, smart phones, mobile computing devices, and telemetry transceivers;
   k) means for a wireless connection, using a donor antenna, between the booster and a wireless communication network in the cellular, PCS, or other radio service;
   l) means for the wireless connection of the booster simultaneously to multiple user equipments;
   m) means for the connection of the booster simultaneously to multiple user equipments operating in different radio services.

2. The communications booster of claim 1, further comprising:
   n) means for providing the current booster status;
   o) means for displaying text that describes attributes stored in the memory.

3. The communications booster of claim 2, wherein the current booster status comprises: the state of the booster, either ON or OFF; validity of the GPS signals received by the booster; validity of the attributes stored in the memory; whether or not the uplink amplifier has been activated; the band selected if the uplink amplifier is activated; the channel selected if the uplink amplifier is activated; and any device error messages.

4. The communications booster of claim 1, wherein the means for storing the attributes comprises a removable, updatable memory.

5. The communications booster of claim 1, wherein the means for amplifying the uplink signals only on selected bands and channels comprises a multi-band selector and multi-channel selector.

6. A movable, portable, standalone apparatus for enhancing range and coverage of communications networks, without changing the operational state of those networks, enabling and enhancing compliance with government regulations, comprising:
- a) a GPS antenna for receiving signals from the Global Positioning System;
- b) a GPS receiver, for receiving and decoding a measured latitude, a measured longitude, and a current time;
- c) a removable, updatable memory, for storing attributes organized according to predetermined latitudes and longitudes, said attributes comprising proximity to communications towers or base stations, communications bands and channels in use at said latitude and longitude, the presence of structures, and the presence of other communications infrastructure that would be harmed by interference;
- d) an uplink amplifier and a downlink amplifier
- e) a microprocessor, for collecting the measured latitude, longitude, and current time, retrieving said attributes from the memory that correspond to the closest match between the stored latitude and the stored longitude and the measured latitude and the measured longitude, and using solely said attributes to select a band, a channel, and an activate/deactivate setting of said uplink amplifier;
- f) a rebroadcast antenna, providing a wireless connection between the booster and user equipment, such equipment to include communication handsets, wireless computers, wireless personal digital assistants, wireless video phones, smart phones, wireless computing devices, and telemetry transceivers;
- g) an enabler bus, for providing electronic control of the band and the channel selection, and the activate/deactivate setting of said uplink amplifier;
- h) a multi-band selector, for selecting operation in any one or more bands;
- i) a multi-channel selector, for selecting operation for any one or more channels;
- j) a donor antenna, providing a wireless connection between the booster and a base station transceiver in the cellular, PCS, or other radio service band.

7. The apparatus of claim 6 in which the microprocessor is further operable to authenticate the memory, and in which the microprocessor is operable to direct the uplink amplifier to operate only if the memory is authentic.

8. The apparatus of claim 7 in which, in authenticating the memory, the microprocessor is operable to determine whether the memory has been updated since a predetermined time in the past.

9. The apparatus of claim 6 wherein the microprocessor is further operable to authenticate the attributes stored in the memory, and in which the microprocessor is operable to direct the uplink amplifier to operate only if the attributes are authentic.

10. The apparatus of claim 6 wherein said attributes further comprise a maximum permissible altitude, and wherein the microprocessor is operable to disable the uplink amplifier if a measured altitude exceeds the maximum permissible value retrieved by the microprocessor.

11. The apparatus of claim 6 in which the microprocessor is further operable to determine an amount of elapsed time since collection of the current time; and disable the uplink amplifier if the amount of elapsed time is greater than a predetermined amount.

12. The apparatus of claim 6 in which the attributes, the stored latitude, and the stored longitude in the memory may be encrypted.

13. The communications booster of claim 1 wherein the means for amplifying uplink signals and the means for amplifying downlink signals comprise a bidirectional amplifier.

14. The apparatus of claim 6 wherein the uplink and downlink amplifiers comprise a bidirectional amplifier.

15. The communications booster of claim 1, wherein the means for the wireless connection comprises antennas that may be physically located within a housing for the booster or a cradle.

16. The apparatus of claim 6, wherein the GPS antenna is physically part of either the donor antenna or the rebroadcast antenna.

\* \* \* \* \*